United States Patent [19]

Estes

[11] 4,162,183

[45] Jul. 24, 1979

[54] MAGNETIC TAPE SPLICER

[76] Inventor: Allen C. Estes, Box 357B, Sebago Lake, Me. 04075

[21] Appl. No.: 875,324

[22] Filed: Feb. 6, 1978

[51] Int. Cl.² .................... B29C 27/00; G03D 15/04
[52] U.S. Cl. ................................ 156/505; 156/157; 156/304; 156/497; 156/510; 83/926 J
[58] Field of Search ............... 156/159, 261, 285, 497, 156/505, 506, 510, 538, 502, 518, 157, 304; 83/926 J; 242/58.1, 58.5; 269/21

[56] References Cited

U.S. PATENT DOCUMENTS

| | | | |
|---|---|---|---|
| 3,537,940 | 11/1970 | Nagano | 156/505 |
| 3,558,405 | 1/1971 | Seda | 156/506 |
| 3,596,897 | 8/1971 | Lindsay et al. | 156/505 X |
| 3,930,928 | 1/1976 | Tapert | 156/572 X |

Primary Examiner—Michael G. Wityshyn
Attorney, Agent, or Firm—William Nitkin

[57] ABSTRACT

A device for splicing magnetic tape particularly useful with endless magnetic tape cartridges comprising a splicing block having a cutter guide slot defined therein extending through a tape guideway disposed in the top of the splicing block. A plurality of air ports are located on both sides of the cutter guide slot, the air ports on one side operable independently of the air ports on the other side with means to provide each set of air ports with a source of vacuum suction through the air ports, and a splicing tape holder with vacuum suction means at its base for the holding of splicing tape segments adapted to be maneuvered into a position in the tape guideway to cause the splicing tape segments to make contact with and splice magnetic tape ends disposed in the tape guideway.

1 Claim, 3 Drawing Figures

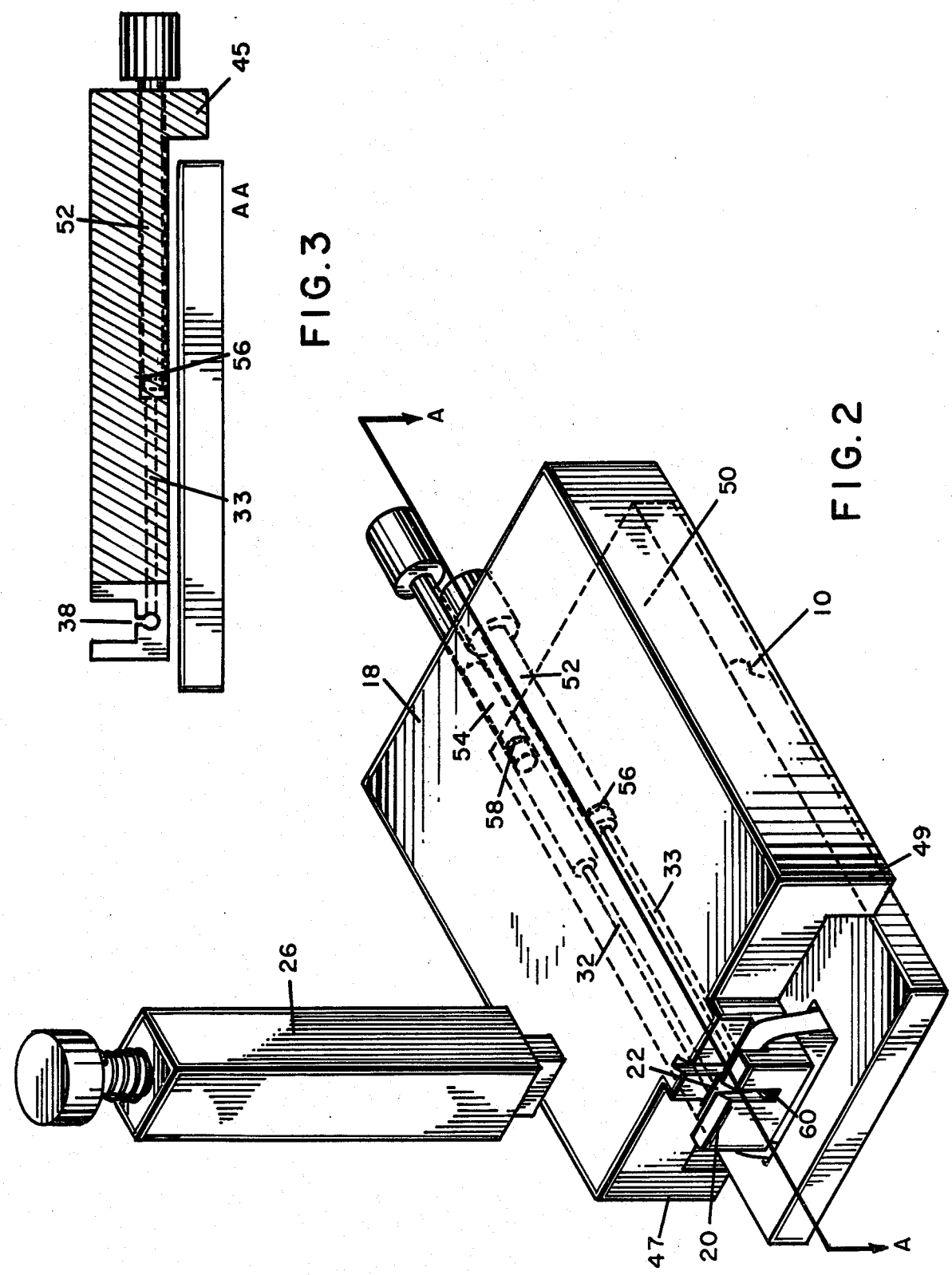

MAGNETIC TAPE SPLICER

BACKGROUND OF THE INVENTION

The present invention relates to tape splicing devices and more particularly to an improved magnetic recording tape splicer for use by an individual especially adapted for the splicing of tape in endless magnetic tape cartridges.

Small magnetic tape cartridges such as disclosed in U.S. Pat. No. 3,420,461 by Cousino are utilized in many fields such as, for example, medical technology. A problem with such cartridges arises when one wishes to add additional material to the cartridge by the splicing in of a section of magnetic tape or when one wishes to excise material from the tape in the cartridge by the removal of a section of such tape. Without extensive and costly equipment, it can be quite difficult for an individual in a home or business environment to work effectively with such magnetic tape due to the tape's small size, inaccessibility and the possibility of losing one or both ends of a severed tape inside the cartridge. At present one can purchase small self-adhesive splicing tape segments to join end portions of such magnetic tape. In using such splicing tape segments, an individual would remove one of these segments from the silicone-coated paper on which they are usually arrayed, usually on the end of a pencil eraser as such splicing tape segments are difficult to handle and would attempt to place it directly on the juncture of the ends of the magnetic tape to be joined in perfect parallel alignment therewith. An additional problem arises in that the plastic composition of the splicing tape segments is often of a similar electrical charge as that of the magnetic tape so that the splicing tape segments, because of repulsion, often tend to jump away from parallel alignment with the magnetic tape and consequently are applied at an angle thereto and extend outward from the edges of the magnetic tape. An unaligned tape juncture is unsatisfactory as it can cause the endless magnetic tape cartridge to malfunction when the splicing tape segment is carried inside the cartridge. A further disadvantage to the manual application of splicing tape segments is that the magnetic tape can pick up oils from manually handling the tape which may affect the quality of tonal reproduction and the smooth functioning of the endless mangetic tape cartridge.

SUMMARY

It is an object of this invention to provide an improved tape splicing unit which allows the user to carry on the entire splicing process with a minimum of manual handling of the magnetic tape. After initially manipulating the magnetic tape out of an aperture in an endless magnetic tape cartridge and placing the tape in the tape guideway of the device of this invention, one can, using the device, repair injured magnetic tapes as well as add portions to or remove portions from such tape. The device of this invention will also allow for the easy placement of splicing tape segments firmly and evenly over the juncture between sections of magnetic tape to be joined.

It is further object of this invention to provide an inexpensive means for splicing magnetic tape that is both easy to use and of simple construction which does not require the use of external sources of electricity.

The device incorporates a splicing block member having a tape guideway disposed in the top thereof, such splicing block being positioned so as to receive the magnetic tape within the tape guideway. A cutter guide slot is disposed across a central portion of the tape guideway in order to direct a razor or other slicing means when cutting through the magnetic tape. In the base of the tape guideway on both sides of the cutter guide slot are disposed a series of air ports connected by air passages to suction bulbs through which vacuum suction can be created to hold the tape in place during the splicing process. A splicing tape segment holder holds by means of vacuum suction splicing tape segments for positioning and affixing such segments to the juncture of the tapes to be spliced. A splicing tape holder alignment member having a channel defined therein can be utilized to direct the splicing tape segment holder over the magnetic tape to be spliced while it is held in the tape guideway.

The objects of this invention will become clearer with reference to the following drawings and Description of the Preferred Embodiment.

BRIEF DESCRIPTION OF THE DRAWINGS

FIG. 2 is a perspective view of the embodiment of this invention showing a magnetic tape cartridge receipt aperture in outline form with cartridge in place within the device of this invention.

FIG. 3 is a cross-sectional view through A—A of FIG. 2.

DESCRIPTION OF THE PREFERRED EMBODIMENT

Figure 1:
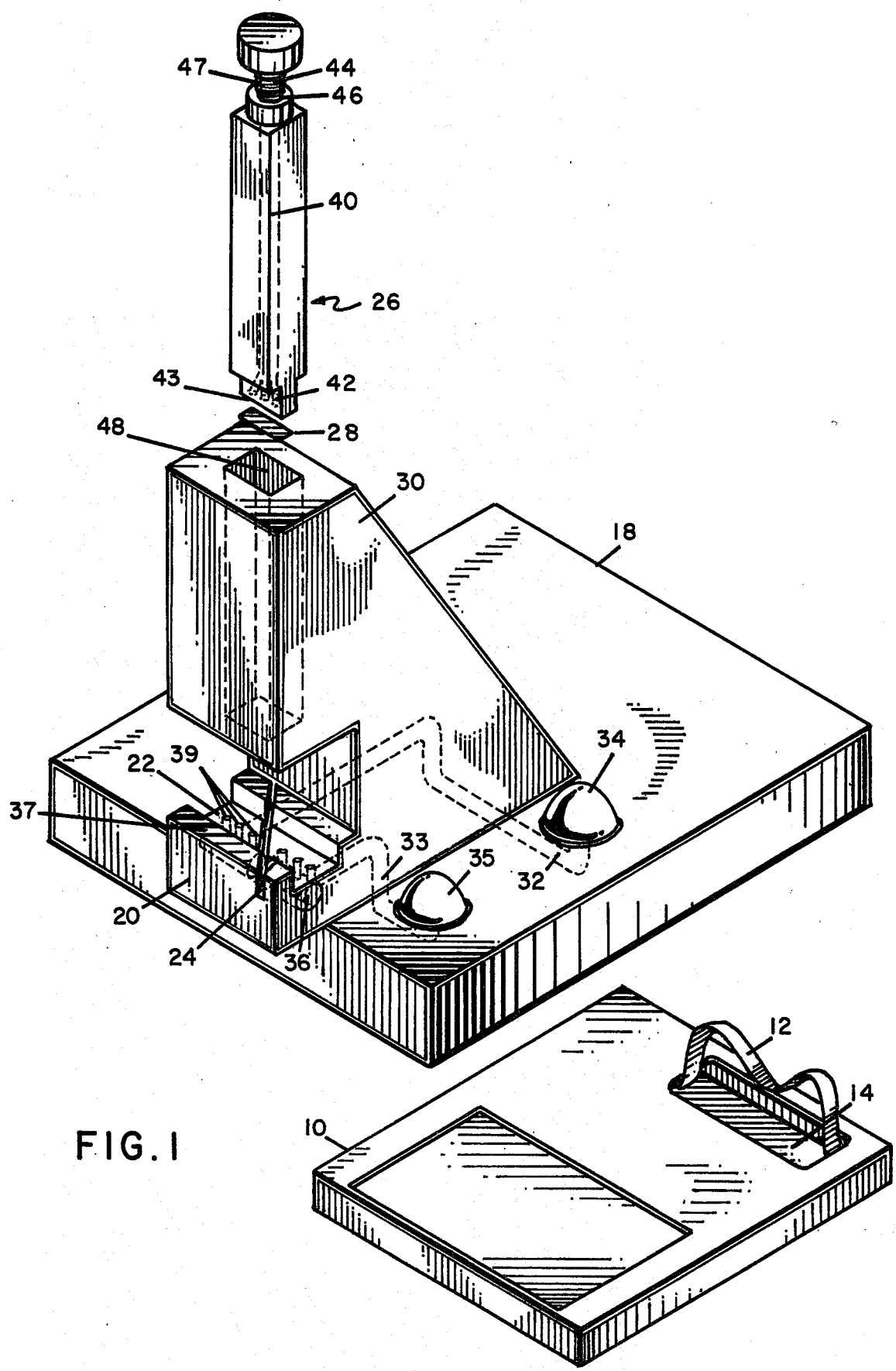
FIG. 1 is a perspective view of the embodiment of this invention wherein the tape cartridge is placed adjacent to the base for operation of the unit.

Disclosed in FIG. 1 is tape splicer 11 having a base member 18 on top of which is located, protruding from one side thereof, splicing block 20. Splicing block 20 has disposed in the top thereof tape guideway 22 with cutter guide slot 24 extending therethrough adapted to accept a blade, such slot extending to, or somewhat below, the base of tape guideway 22. Splicing block 20 is disposed in relation to base 18 such that when an endless magnetic tape cartridge 10 is placed having its track head opening 14, or, in the alternative, its pressure roll opening below splicing block 20, the magnetic tape can be manipulated out of the endless mangetic tape cartridge through opening 14. Manipulating the tape out of the cartridge can be accomplished in some instances by using the cover member of the cartridge opening and the tape placed within the channel of tape guideway 22 without lateral twisting of the tape once it is at rest. It is preferable to have tape guideway 22 adapted to be substantially positioned over the location of the magnetic tape as it normally moves within the endless magnetic tape cartridge 10 above aperture 14. Cutter guide slot 24 allows a razor or other cutting means to be moved through slot 24 to sever the tape. This cutter guide slot can be at an angle to the magnetic tape so that the abutment of the severed tapes can have more linear contact area. The magnetic tape is held in place within tape guideway 22 by vacuum suction which is independently applied on both sides of cutter guide slot 24 so that one end of the tape to be spliced can be held in position while the other end is removed for insertion of a new section of tape to be joined with the portion still held in place by the vacuum suction or for just the removal of a section of tape. To provide the vacuum scution, first suction bulb 34 positioned on or near base 18 is interconnected by first air passageway 32 to first internal chamber 37 within splicing block 20 which opens into a series of first air ports 39 positioned on one side of cutter guide slot 24. Similarly second suction bulb 35 is interconnnected by second air passageway 33 to second internal chamber 36 which opens into the base of tape guideway 22 through second air ports 38 positioned on the other side of cutter guide slot 24. One can alternately manipulate the suction bulbs which can be composed of rubber or other equivalvent flexible material so as to first force air out of either of the air ports 38 or 39 as desired. When either suction bulb is released, air will tend to rush into its air ports, but when the magnetic tape 12 is in position in tape guideway 22, the tape will obstruct the entry of air and thereby be held in place by the air pressure above the tape. To release the tape, one merely need further depress the appropriate suction bulb to force some remaining air in the suction bulb out through its respective air ports which will release the tape quite easily. Affixed to the top of base 18 is optional splicing tape holder alignment member 30 which assists in aligning splicing tape holder 26 directly over tape guideway 22 so that splicing tape segment 28 can be accurately positioned on magnetic tape 12 extending over each side of cutter guide slot 24 in order to join the severed sections of magnetic tape together. Splicing tape segments usually are sold arrayed on a sheet of non-stick paper and have self-adhesive means on their bottoms. No additional adhesive liquid need be utilized when using such self-adhesive splicing tape segments. The splicing tape segments are lifted from the silicone-coated paper on which they are arrayed by splicing tape holder 26. Defined within splicing tape holder 26 is splicing tape air channel 40 shown in outline form in FIG. 1 terminating in one or more air holes 42 at its base 43 which base is similar in size to the size of splicing tape segment 28. At the top of the splicing tape holder air channel 40 is releasable plunger member 44 having at its base a plunger gasket 46 or similar type of O-ring which is adapted to slide in airtight relationship within splicing tape holder air channel 40 to receive the plunger member. Spring member 47 can be incorporated into plunger member 44 to urge the plunger member to its upward position when not in use. To use the splicing tape holder 26, one places its base 43 in alignment over splicing tape segment 28 while the tape segment is still on its paper backing and depresses plunger 44 forcing air out of air hole(s) 42. One then releases releasable plunger 44 causing it to rise up and further causing air to enter through air hole(s) 42. Since splicing tape segment 28 is in contact with air hole(s) 42, no air can enter and a vacuum suction is created holding the splicing tape segment 28 in place thereon. One then takes the splicing tape holder 26 and manipulates it so that its base 43 enters the tape guideway 22 so that the splicing tape segment 28 is disposed over, in alignment with, and attached to the magnetic tape ends to be joined. One means of carefully aligning the splicing tape segment to the magnetic tape ends to be joined is by having splicing tape holder 26 move within splicing tape holder channel 48 disposed over and aligned with the magnetic tape ends to be joined. Such channel can be located within splicing tape holder alignment member 30 affixed to base 18. In use, one would pass the splicing tape holder 26 holding the splicing tape segments 28, shown in FIG. 1 somewhat separated therefrom for purposes of illustration, but which is in place on base 43, into splicing tape holder channel 48, pressing it down onto the magnetic tape held by vacuum suction in tape guideway 22 of splicing block 20 so that the splicing tape segment makes contact with and joins the two ends of the magnetic tape together. When one wishes to remove the splicing tape holder 26 from the joined tape ends, one further depresses releasable plunger 44 forcing more air through splicing tape holder air channel 40 out air hole(s) 42 and the splicing tape segment 28 will be immediately released. One can then lift splicing tape holder 26 up out of the splicing tape holder channel 48. The splice is then completed and the joined magnetic tape can then be lifted out of tape guideway 22 and manipulated back into opening 14 of the endless magnetic tape cartridge 10.

A second embodiment of the device of this invention illustrated in FIG. 2 shows base 18 having defined in its bottom an endless magnetic tape cartridge receipt aperture 50 adapted and designed to be of a size to receive the endless magnetic tape cartridge 10. Splicing block 20 protrudes from base 18 in the area above opening 14 of the endless magnetic tape cartridge so that similarly as disclosed in the embodiment illustrated in FIG. 1 the magnetic tape ends to be spliced can be lifted into tape guideway 22 of splicing block 20. Splicing tape holder 26 is then positioned onto the ends of the magnetic tape to be joined or a splicing tape holder alignment member 30 can optionally be utilized on the top of base 18 to provide a channel 48 to pass the splicing tape holder 26 through for assistance in alignment. If no alignment member is utilized, the tape guideway 22 can be located deeper in splicing block 20 so that when its sides are spaced apart the width of base 43, they will act as support for splicing tape holder 26. Also seen in FIG. 2 are first and second air passageways 32 and 33 interconnected to their respective suction means. Shown is an alternative suction means provided by manually movable cylinders 52 and 54 which move in airtight relation within sections of air passageways 32 and 33 and which can optionally have cylinder gaskets 56 and 58 respectively thereon.

FIG. 3 is a cross-sectional view through A—A of FIG. 2. Seen in this view are second air port 38 and second air passageway 33 extending to the rear of the unit 11 where it can terminate in suction means such as illustrated in FIG. 1 or in equivalent bulb means positioned in other locations remote to base 18 but is herein illustrated to show the movable cylinders of FIG. 2. Sides 49 and 47 are not absolutely necessary to the operation of this embodiment but rear side 45 does help with prealignment of the guideway over the tape.

In some embodiments of the device of this invention where the tape guideway 22 is constructed of plastic, cutter guide slot 24 can extend further into splicing block 20 and a hard insert member 60 such as composed of metal can be placed therein to bring the bottom of the cutter guide slot 24 level with the tape guideway 22 in order for the cutting knife to have a hard surface on which to cut the magnetic tape 12 and not to score or cut into a tape guideway constructed of a softer material. It should be noted that any metal incorporated in the construction of the device of this invention should not be steel or other metal which will affect the magnetic tape. Brass, aluminum, stainless steel or equivalents should be utilized. It also has been found preferable to utilize the head aperture of the tape cartridge for the tape splicing operation as it lends itself to easier lifting out of the magnetic tape. One should avoid wrinkling the magnetic tape when utilizing the device of this invention as wrinkles may interfere with the functioning of the endless magnetic tape cartridge.

Although the present invention has been described with reference to particular embodiments, it will be apparent to those skilled in the art that variations and modifications can be substituted therefor without departing from the principles and spirit of the invention.

I claim:

1. A device for splicing cartridge-held magnetic tape utilizing splicing tape segments and wherein said magnetic tape is accessible through an opening in said cartridge, comprising:
    a splicing block adapted to be of a width less than the width of the access opening of said cartridge to said magnetic tape;
    a tape guideway disposed in said splicing block having a bottom and sides;
    a cutter guide slot defined in said splicing block within the sides of said tape guideway;
    a first set of air ports defined in said tape guideway's bottom positioned to one side of said cutter guide slot;
    a second set of air ports defined in said tape guideway's bottom positioned to the opposite side of the guide slot relative to said first set of air ports;
    a first vacuum means adapted to create a suction through said first set of air ports;
    a second vacuum means adapted to create a suction through said second set of air ports independently of said first vacuum means;
    a splicing tape segment holder having a base with at least one air hole defined therein;
    a third vacuum means adapted to create a suction through said air hole in order to hold a splicing tape segment to said base to join magnetic recording tape ends when said splicing tape segment holder when holding a splicing tape segment is maneuvered into a position so that said splicing tape segment contacts the magnetic tape ends to be joined; and
    a base member having a top, a front side, and downwardly projecting a rear side with said splicing block affixed at said front side disposed above the area for positioning of the magnetic tape cartridge so that the magnetic tape, after being placed in said tape guideway, is not laterally displaced from its vertical extension out of said cartridge, said base member further having defined therein a magnetic tape cartridge receipt aperture adapted to receive a magnetic tape cartridge in a position so that its magnetic tape can be placed in said tape guideway when the rear of said magnetic tape cartridge makes contact with and is prevented from further rearward movement by said downwardly projecting rear side so as to cause the desired alignment of said magnetic tape beneath said tape guideway.

* * * * *